Jan. 23, 1968   CHARLES T. HSU   3,365,060
SETTLING SYSTEM
Filed Aug. 4, 1964

INVENTOR
CHARLES T. HSU
BY *Frank J. Jordan*
ATTORNEY ns. 23, 1968

3,365,060
SETTLING SYSTEM
Charles T. Hsu, Edison, N.J., assignor to American Standard Inc., a corporation of Delaware
Filed Aug. 4, 1964, Ser. No. 387,383
19 Claims. (Cl. 210—84)

This invention relates to a method and apparatus for removing settleable solids from a continuous flow of liquid such as from a sewage trickling filter effluent, activated sludge effluent, or the like. More particularly, this invention relates to a method and apparatus for settling solids from a liquid by passing the fluid through a cellular structure which is rotated transversely to the path of the flowing fluid.

The invention may be utilized in connection with any solid-liquid treatment facility where it is desirable to remove the bulk of the solids or sludge in an easy, quick manner. Thus it may be used, for example, in sewage treatment plants. Sewage is generally given different types of pretreatment before discharge into bodies of water in the public domain. Such prior treatment may include bacterial decomposition processing in large tanks in order to digest the solids. As such bacterial action continues, solids in liquid become settleable and thus easily removeable. In some instances the solid separation efforts are undertaken on the sewage prior to bacterial treatment or other treatment.

Accordingly, the present invention contemplates a cellular structure positioned in the flow arrangement of a solid-liquid mixture flow which leads to the quick settling of solid material. The concept is predicated upon the fact that a small fall dimension for the solid material is desirable for efficient settling. It will be appreciated that in the ordinary settling tank the solid particles being heavier than the liquid will settle to the bottom due to the usual gravitational forces. The larger the dimension required for the solid particle to fall the longer it will take for such particles to fall to the bottom of the tank. Thus a stacked arrangement of shallow pans achieve a greater settling rate than does a deep tank of the same overall dimension. However, the shallow pans accumulate sludge which quickly clogs the cross-sectional area between each pan. Accordingly, such sludge has to be removed to prevent such clogging.

In the present invention, a cellular structure is utilized having cells which are positioned axially with respect to the flow of liquid. The cellular structure is rotatably mounted in the path of the liquid in a manner so that half of the section thereof dips into the liquid while the other half thereof is above a maintained liquid level. As the cells dip into the liquid and are exposed to the solids, the latter settle therein and then are removed as the rotating cells are brought above the liquid level.

In order to more fully understand the concepts of the present invention, attention is now directed to the drawings in which like reference numerals identify like parts throughout and in which.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed is for the purpose of description and not of limitation.

Figures 2, 3:
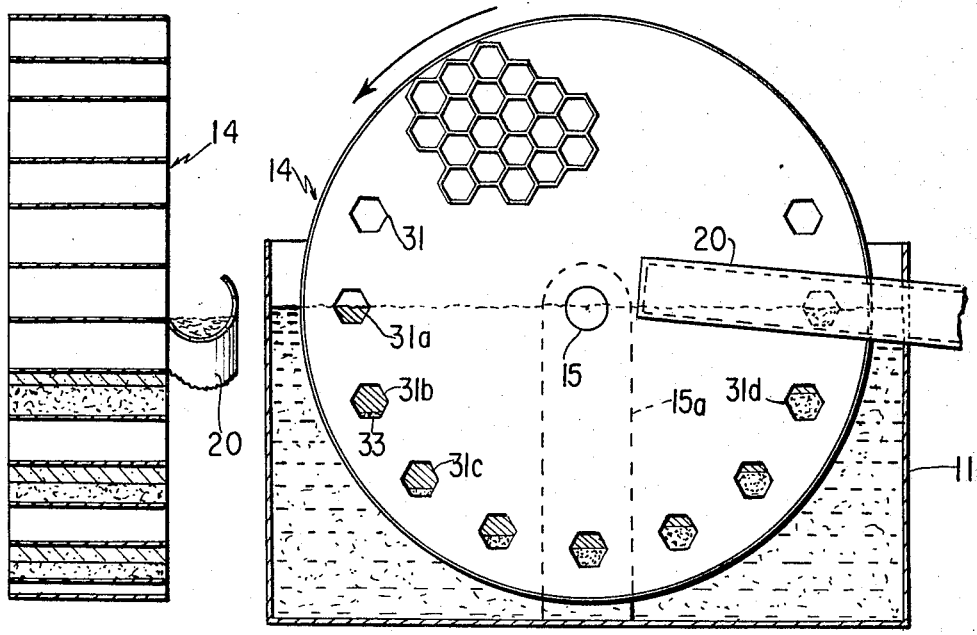
FIGURE 2 is an enlarged view through the tank of FIG. 1.
FIGURE 3 is a partial cross-sectional view of the rotatable cellular structure showing representative cells.
Figure 1:
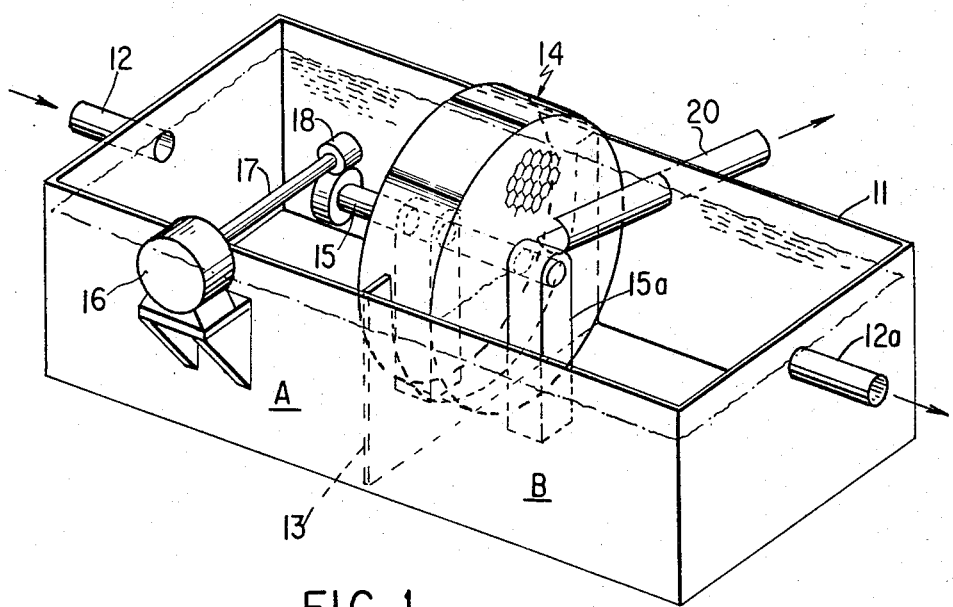
FIGURE 1 is a perspective view of one embodiment of the present invention.

FIG. 1 shows a tank 11 to which a solid-liquid mixture is introduced through inlet conduit 12. The tank 11 is divided into two sections, partly by means of baffle 13 and partly by the rotatable cellular structure 14. The liquid flows through inlet conduit 12 to the first section A of the tank 11 and then into the second section B of the tank 11 through the cells of the structure 14. As the second section B fills, the liquid overflows through outlet 12a. Suitable throughput values are maintained so that the tank 11 is maintained in a filled condition for the most part.

The structure 14 has a plurality of longitudinally and axially positioned cells. These cells may have a honeycomb or hexagonal cross-section as shown. This particular cell form offers an advantage that the cellular structure 14 may be machine made from inexpensive material such as resin impregnated paper. The structure 14 is mounted on a suitable shaft 15 supported by suitably positioned brackets 15a. A drive means such as an electric motor 16 is suitably connected through a shaft 17 to a gear assembly 18 in order to impart rotational movement to the cellular structure 14.

The dimensions of the cells in the structure 14 are such that the free mean fall of the solid particles in the liquid is dimensionally quite short. For instance, in a cell size of approximately three-quarters of an inch the average fall is only between approximately one-quarter of an inch to one-half of an inch. Additionally, as the liquid passes through a cell, the velocity gradient between the side and center of the cell shears the liquid to promote settling.

The honeycomb structure 14 is rotated continuously by the drive means 16 at a relatively slow speed, 0.5 to 10 revolutions per hour, for example, so as not to interfere with the flow of the solid-liquid mixture through the structure 14.

It will be seen a trough 20 is positioned across the front of the cellular structure 14 at the outlet side of the latter. This trough 20 is designed to receive the settled or sludge material that has accumulated in the cells of the structure 14. It is positioned so that the open top thereof is slightly above the water level, for example, one-sixteenth of an inch to one inch above. The trough 20 collects the sludge and solid particles and discharges it outside of the tank 11 for further treatment or the like.

It will be appreciated that each cell, for example cell 31 above the liquid level contains air and nothing else. As the cell 31 dips into the liquid due to the rotation of structure 14, it is partially filled with liquid as can be seen at 31a. As it dips below the liquid level it becomes filled with liquid in its entirety while at the same time the solid-liquid mixture is flowing therethrough. It will be seen that at 31b a small quantity of sludge 33 is beginning to accumulate which has settled out of the flowing solid-liquid mixture. As the cell 31 moves deeper into the liquid as at 31c a greater quantity of the sludge is present. It will be seen as the structure 14 rotates through the body of liquid containing the solid material each cell has a greater and greater quantity of sludge material deposited therein until as at 31d it contains a greater quantity than at any other point. As the structure 14 continues to rotate, the cell 31 is lifted above the water level. As it does so the liquid contained in the cell 31 flows out before the sludge because the viscosity of the liquid is less than that of the sludge. The cell 31 does not have to rotate a great deal above the liquid level before all of the liquid contained therein has emptied therefrom. The settled solids or sludge which has accumulated in the cell 31 flows out from the cell 31 and falls into a trough 20 as a viscous material, and by inclining the trough 20, or providing other manipulative means, the sludge flows outwardly and beyond the system of the present invention. By adjusting the distance between the trough and the liquid level, the trough is set to collect sludge only. Thus the device of the present invention is self-clearing of the settled out sludge so that the cells in the structure 14 are relatively clean as they approach the liquid again for re-accumulation of liquid and sludge material in the following cycle.

If desired, the axis of the cellular structure 14 may be inclined slightly relative to horizontal so as to provide a slight downhill slope to each of the cells. As an alternate embodiment, removal of sludge from the cellular structure may be promoted by vibrating the cellular structure 14.

One of the features of the present invention is that the settling unit may be relatively small and yet may accumulate large quantities of solid material from the solid-liquid mixture. Additionally, by employing a rotating cellular structure, the arrangement of the present invention results in a continuously operating system which is self-cleaning.

It will be apparent that many changes and modifications of the several features described herein may be made without departing from the spirit and scope of the invention. It is therefore apparent that the foregoing description is by way of illustration of the invention rather than limitation of the invention.

What is claimed is:

1. A settling system for removing settleable solids from a solid-liquid mixture, comprising a container for said solid-liquid mixture having means to establish a normal level of liquid in said container, means dividing said container into a first section and a second section, said means comprising a rotatably mounted cellular structure having a plurality of cells for settling the solids therein from said mixture, said cellular structure having a portion thereof submerged in said solid-liquid mixture, the cells of said submerged portions communicating said first and second sections of said container, means to cause said mixture to flow from said first section toward said second section through said submerged cells, and means disposed above the normal liquid level and associated with said second section receiving the solids that settle during the flow of the mixture through said submerged cells as the latter emerge from the solid-liquid mixture while the clarified liquid passes to said second section of said container.

2. In a settling system as set forth in claim 1 wherein said cellular structure is rotated about a generally horizontal disposed axis.

3. In a settling system as set forth in claim 1 wherein each of said cells is defined by an elongated conduit, the axis of such conduits being horizontally disposed.

4. In a settling system as set forth in claim 1 wherein the first said means further comprise a baffle separating said first and second sections of said container, said baffle having a cutout portion in which said rotatably cellular structure is disposed.

5. A settling system for removing settleable solids from a solid-liquid mixture, comprising a container for said solid-liquid mixture having means to establish a normal level of liquid in said container, means dividing said container into a first section and a second section, said means comprising a rotatably mounted cellular structure having a plurality of cells for settling the solids therein from said mixture, said cellular structure having a portion thereof submerged in said solid-liquid mixture, the cells of said submerged portions communicating said first and second sections of said container, means to cause said mixture to flow from said first section toward said second section through said submerged cells, and trough means associated with said second section and disposed above the normal liquid level thereof receiving the solids that settle in the submerged cells during the flow of said mixture through said submerged cells, from said first section to said second section of said container as the solids emerge from the solid-liquid mixture while the clarified liquid passes to said second section of said container.

6. A settling system as set forth in claim 5 wherein each of said cells is defined by an elongated conduit, the longitudinal axes of such conduits being inclined relative to horizontal to present a downhill slope to the liquid passing therethrough.

7. In a settling system for removing settleable solids from a solid-liquid mixture, comprising a compartment for said solid-liquid mixture having means to establish a level of liquid in said compartment, means dividing said compartment into a first section and a second section, said means comprising a rotatably mounted cellular structure having a plurality of elongated cells for settling the solids therein from said mixture, said cellular structure having a portion thereof below the liquid level of said solid-liquid mixture communicating said first and second sections of said compartment, means to cause said mixture to flow from said first section to said second section through said submerged cells, a trough associated with the second section side of said cellular structure above the normal liquid level of said compartment, said trough receiving from said rotating cells the solids that settle in the submerged cells during the flow of said mixture through said submerged cells as the latter emerge from the solid-liquid mixture while the clarified liquid passes to said second section of said compartment.

8. In a settling system as set forth in claim 7 wherein said trough is inclined relative to horizontal to provide a downhill slope for the settled solids therein.

9. In a settling system as set forth in claim 7 wherein said cellular structure is a cylindrical core.

10. A settling system for removing settleable solids from a solid-liquid mixture comprising a compartment for said solid-liquid mixture, rotatable means rotatable about a horizontal axis, said rotatable means being mounted to rotate in said compartment whereby a portion thereof dips into said solid-liquid mixture, solid-liquid inlet means on one side of said rotatable means and solid-liquid mixture outlet means on the other side of said rotatable means, said inlet means and outlet means being positioned to maintain a liquid level in said compartment, said rotatable means comprising a cellular structure having cells for settling the solids therein from said mixture, a trough extending horizontally across a front of said rotatable means on the side of the outlet means, said trough positioned to receive settled solids from the cells of said cellular structure, and a baffle, said rotatable member and said baffle together dividing said compartment into two sections.

11. A settling system as set forth in claim 10 wherein the said trough has an inlet above the solid-liquid mixture level.

12. A settling system removing settleable solids from a solid-liquid mixture comprising a compartment for said solid-liquid mixture, a rotatable member having a horizontal axis, said rotatable member mounted to rotate in said compartment whereby a portion thereof dips into said solid-liquid mixture, solid-liquid mixture inlet means on one side of said rotatable member and solid-liquid mixture outlet means on the other side of said rotatable member, said inlet means and outlet means being positioned to maintain a solid-liquid mixture level, said rotatable member being comprised of an axially extending cellular structure having cells for settling the solids therein from said mixture, said rotatable member being rotated by drive means, a trough extending horizontally across at least a portion of said rotatable member on the side of the outlet means, said trough positioned to receive settled solids from the cells of said rotatable member and positioned to be above the solid-liquid mixture level, and a baffle, said rotatable member and said baffle together dividing said compartment into two sections.

13. In a method for removing settleable solids from a solid-liquid mixture comprising flowing a solid-liquid mixture, establishing a normal level of said flowing mixture, breaking up said flow in to plurality of separated streams, simultaneously rotating said plurality of streams about an axis substantially parallel to the direction of flow of said streams while settling out the solids in said separated streams, removing settled solids from said streams above said normal mixture level, and recombining said streams.

14. A method for removing settleable solids from a solid-liquid mixture, comprising flowing a solid-liquid mixture, establishing a normal level of said flowing mixture, breaking up said flowing mixture into a plurality of separated streams by directing said flow through a cellular structure having cells therein generally parallel to the direction of flow, moving said streams transversely with respect to said flow by rotating said cellular structure while settling out the solids in said streams, removing the settled solids from said streams above said normal mixture level, and recombining said streams after the settled solids have been removed therefrom.

15. A method as set forth in claim 14 wherein said flowing mixture has a normal liquid level and said settled solids are removed from said cells above the normal liquid level of said flowing mixture.

16. In a settling system, comprising means causing a solid-liquid mixture to flow in a generally horizontal direction, means to establish a normal level of said flowing mixture, a cellular structure rotatably movable about a substantially horizontally disposed axis and having cells rotatable therewith and at least partly submerged in said flow, said cells opening through said structure for continuing said mixture flow therein, said submerged cells settling solids therein from said continuing flow, and means above said normal level for removing said settled solids from said cells.

17. In a settling system as set forth in claim 16 wherein the cells of said cellular structure are hexagonal in cross section.

18. In a settling system as set forth in claim 16 wherein said cellular structure is fabricated of resin impregnated paper.

19. The settling system of claim 16, wherein said horizontally disposed axis is substantially parallel to said horizontal direction of flow of said mixture.

References Cited

UNITED STATES PATENTS

| | | | |
|---|---|---|---|
| 199,450 | 1/1878 | Kirkham et al. | 261—92 |
| 1,718,871 | 6/1929 | Nordell | 210—84 X |
| 2,796,145 | 6/1957 | King | 261—92 X |
| 3,018,896 | 1/1962 | Gewiss. | |
| 3,067,878 | 12/1962 | Genter et al. | 210—83 |
| 3,165,468 | 1/1965 | Strader | 210—532 X |
| 3,182,799 | 5/1965 | Krofta | 210—83 |

FOREIGN PATENTS

| | | |
|---|---|---|
| Ad. 74,623 | 12/1960 | France. |
| 109,648 | 9/1917 | Great Britain. |
| 957,925 | 5/1964 | Great Britain. |

REUBEN FRIEDMAN, *Primary Examiner.*

D. M. RIESS, *Assistant Examiner.*